March 9, 1965 G. STRULL 3,173,091
MICROWAVE DETECTOR APPARATUS
Filed Aug. 30, 1960
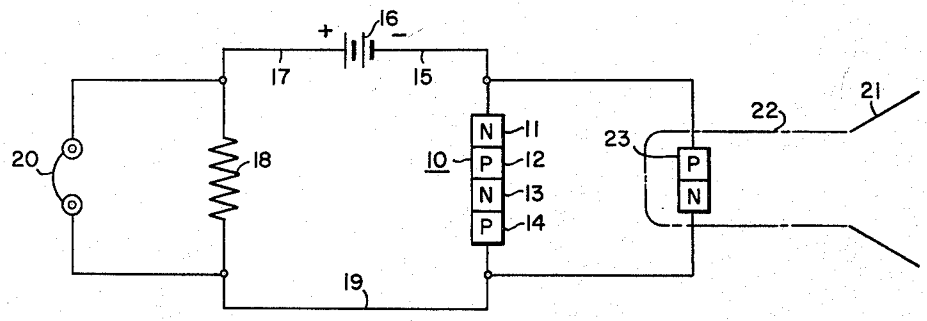
WITNESSES
Edwin E. Bassler
James F. Young
INVENTOR
Gene Strull
BY Maury I. Hull
ATTORNEY United States Patent Office 3,173,091
Patented Mar. 9, 1965

3,173,091

MICROWAVE DETECTOR APPARATUS

Gene Strull, Pikesville, Md., assignor to Westinghouse Electric Corporation, East Pittsburgh, Pa., a corporation of Pennsylvania Filed Aug. 30, 1960, Ser. No. 52,923
3 Claims. (Cl. 325—300)

This invention relates to microwave detectors, and more particularly to an improved detector of microwave energy in which the presence of electromagnetic wave energy of microwave frequency is directly indicated by the frequency of an audio signal.

Prior art microwave detector apparatus has generally included as a minimum a receiving antenna, an amplifier and some modulation means. In particular, if the energy to be detected is pulsed at frequencies higher than audio frequencies, additional complexity is required in the detector circuit.

The apparatus of the instant invention overcomes these and other disadvantages of the prior art by employing a monolithic semiconductor free running multivibrator delivering an audio frequency signal to a suitable transducer or indicator, for example a head set worn by the operator of the apparatus. Connected in parallel with the semiconductor multivibrator element is a high frequency semiconductor diode which exhibits a change in capacity in a high frequency field. This high frequency diode is located in a directional antenna device of suitable construction for concentrating the wave energy gathered by the antenna upon the diode. The change in capacity of the high frequency diode changes the total storage of the circuit including the semiconductor multivibrator changing the frequency of oscillation of the free running multivibrator.

Accordingly, a primary object of the invention is to provide new and improved radiant energy detector apparatus for microwave frequencies.

Another object is to provide new and improved microwave detector apparatus in which the presence of microwave energy is directly indicated by a change in the frequency of an audio tone.

A further object is to provide new and improved microwave energy detector apparatus suitable for monolithic semiconductor construction.

These and other objects will become more clearly apparent after a study of the following specification when read in connection with the drawing, in which the single figure thereof is an electrical circuit diagram of the apparatus according to the preferred embodiment of the invention.

In the figure, there is shown at 10 a semiconductor multivibrator structure comprising a four layer semiconductor device having npnp regions 11, 12, 13 and 14 respectively as shown. The n region 11 at the end of the structure is connected by way of lead 15, battery 16, lead 17, resistor 18 and lead 19 to the p region 14 at the other end of the device. Connected in parallel with the load resistor 18 may be a head telephone set 20 or a visual frequency indicator.

The circuit so far described constitutes a free running multivibrator which runs at an audio frequency of, for example, 2,000 to 15,000 cycles per second, the tone being audible in the head set 20. The device 10 and the multivibrator circuit are more fully described in a copending application of Gene Strull for "Semiconductor Device," Serial No. 852,116, now Patent No. 3,064,132, filed November 10, 1959, and assigned to the assignee of the instant invention.

There is shown at 21 a directional antenna having disposed in energy transmitting means 22 connected thereto a high frequency diode 23, the diode being connected to and across the aforementioned leads 15 and 19 and preferably being disposed in the wave guide 22 at a position where the diode is subjected to the maximum high frequency field produced by received wave energy. As previously stated, the p-n diode 23 exhibits a change in capacity in a high frequency field. The diode 23 may be a type known in the trade as a IN23C, and the frequency of the microwave energy may be, for example, 10 kilomegacycles per second. Under such conditions, radio frequency energy impinging on the diode 23 changes the total circuit capacity thereby changing the frequency of oscillation of the free running multivibrator, and this change in frequency is audible in head set 20 to the operator of the apparatus. It will be observed that the change in audio frequency of the sound coming from head set 20 is not dependent upon the wave energy arriving at antenna 21 being pulsed at an audio frequency. Unmodulated radio frequency energy arriving at antenna 21 will produce a change in the audio frequency, as will energy which is frequency modulated, or which is amplitude modulated at a frequency which is completely above the audible range.

In the adjustment of the circuit of the figure, if desired, the basic frequency may be set at just above audio and when radiation concentrated by the antenna 21 impinges on the diode 23 the frequency decreases giving the pilot an audible signal. Alternately, the apparatus may be adjusted to give a continuous audio signal, the frequency of the signal changing when radiation for which the antenna is tuned or to which it is receptive strikes the antenna.

The apparatus is particularly suitable for use on aircraft and is especially valuable in indicating to the pilot when a radar beacon is impinging on his aircraft. The apparatus is rugged, is small and of light weight and may, with the possible exception of diode 23, fit into the airplane pilot's head set.

On the other hand, elements 10, 18, 23 and leads 15, 19, etc. may be comprised in one monolithic semiconductor block located in the wave guide or antenna, with leads brought out to an energizing source of potential and a signal frequency indicator.

As previously stated, the apparatus is suitable for sensing any type of beacon, pulsed or continuous, and furthermore, the capacity of the diode is sensitive to radio frequency fields of small intensity, so that the apparatus will detect relatively weak microwave energy which reaches the aircraft and antenna 21.

The term "microwave" as employed herein includes radiant energy from .3 kmc. to 30 kmc. in frequency.

Whereas the invention has been shown and described with respect to the preferred embodiment thereof which gives satisfactory results, it should be understood that changs may be made and equivalents substituted without departing from the spirit and scope of the invention.

I claim as my invention:

1. Microwave detector apparatus comprising semiconductor means including energizing means and forming a free running multivibrator, said multivibrator being capable of generating a signal frequency in the audio range in accordance with the multivibrator parameters including capacity, indicator means operatively connected to said multivibrator and giving an indication of an audio frequency signal generated by said multivibrator, means for receiving radiant energy, semiconductor junction diode means operatively coupled with said means for receiving radiant energy and connected in parallel with said multivibrator, said diode means responsive to radiant energy to change its capacity and the circuit parameters of said multivibrator, thereby changing the frequency of the signal generated by said multivibrator.

2. Microwave detector apparatus comprising oscillator means for generating a signal detectable by human senses, said oscillator having a circuit the frequency of which is a function of the total capacity included in the oscillator circuit, antenna means, semiconductor junction diode means coupled to said antenna means and connected to said oscillator circuit to add its capacity across said circuit, whereby the radiant energy acting on said diode changes the frequency of said oscillator and means connected to said oscillator for rendering changes in the frequency of said oscillator detectable by human senses.

3. Microwave detector apparatus comprising signal generating means for generating signals detectable by human senses, said generating means having its frequency determined by a predetermined circuit parameter, a semiconductor device connected to said signal generating means and providing a part of said circuit parameter for said generating means, said semiconductor device being responsive to radiant energy impinging thereupon to change said parameter thereby causing a change in the frequency of said signal generating means.

References Cited in the file of this patent

UNITED STATES PATENTS

| | | |
|---|---|---|
| 2,780,752 | Aldrich et al. | Feb. 5, 1957 |
| 2,824,175 | Meacham et al. | Feb. 18, 1958 |
| 2,855,524 | Shockley | Oct. 7, 1958 |
| 2,858,448 | Brown | Oct. 28, 1958 |
| 2,862,416 | Doyle | Dec. 2, 1958 |
| 2,884,607 | Uhlir | Apr. 28, 1959 |
| 2,901,613 | Patterson et al. | Aug. 25, 1959 |
| 2,914,665 | Linder | Nov. 24, 1959 |
| 2,963,576 | Enikeiff | Dec. 6, 1960 |
| 2,964,637 | Keizer | Dec. 13, 1960 |